United States Patent Office

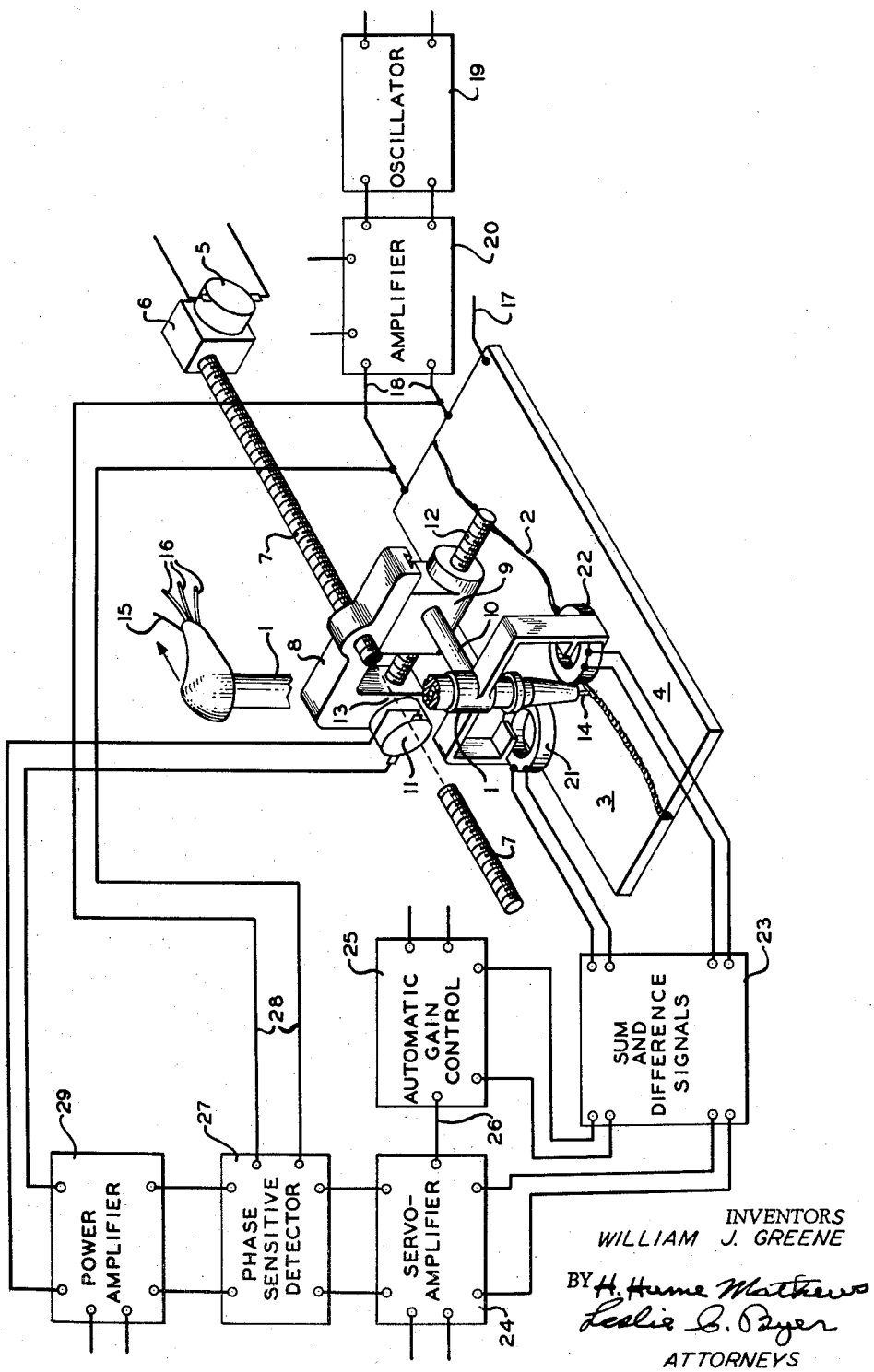

3,017,496
Patented Jan. 16, 1962

3,017,496
AUTOMATIC SEAM FOLLOWER
William John Greene, Scotch Plains, N.J., assignor to Air Reduction Company, Incorporated, New York, N.Y., a corporation of New York
Filed Nov. 20, 1958, Ser. No. 775,186
14 Claims. (Cl. 219—124)

My invention relates to methods and apparatus for electromagnetically following a seam between workparts. It is of particular utility for use in guiding the workparts and a welding agency or other tool of an automatic machine relative to one another along a seam between these workparts which are positioned relatively to the machine with the seam between them deviating wholly or in part from the path of relative travel in the machine of the workparts and the welding agency or other tool lengthwise of the seam.

For example, in automatic welding where the workparts are stationary, the welding agency must be traversed along a path of travel which will center it over the seam between the workparts as it travels lengthwise thereof to form a weld at the seam. To accomplish this result the edges of the workparts must be prepared to provide, upon assembly relative to the machine, a seam which can be aligned with the travel of the welding agency along the guide mechanism provided therefor in the machine. This requires accurate edge preparation of the workparts and careful placement of these workparts in assembled relationship relative to the path of travel of the welding agency in the machine. Otherwise the machine operator must continuously observe the welding operation and make lateral adjustments of the welding agency relative to the seam to center it over the seam where the direction of travel of the welding agency is divergent from the direction of the seam or from localized portions thereof. Since the seam between like workparts of like work assemblies will not usually have like variation in seam contour, a special work-holding fixture alone or in combination with a special guide for the welding agency is not a satisfactory solution for this problem. Even if the seam between the assembled workparts has the contour of the path of travel of the welding agency, considerable time and care is required in positioning the workparts relatively to the machine so that the seam between them and the path of travel of the welding agency in the machine are in alignment with one another. It is consequently desirable to provide a method and apparatus which can be used for automatically following a seam between workparts which are assembled relatively to a machine in which the travel of the welding agency in the machine relative to stationary workparts or the travel of the workparts relative to a stationary welding agency is not in complete alignment with the seam between the workparts. Such an arrangement will render the welding operation completely automatic and eliminate the difficulties above considered.

It is an object of my invention to provide methods and apparatus for electromagnetically following a seam between workparts.

It is a further object of my invention to provide methods and apparatus for detecting and following the center line of an electromagnetic flux field which is established lengthwise of a seam between workparts.

It is also an object of my invention to provide methods and apparatus for centering a welding agency over a seam between workparts by establishing, lengthwise of the seam, a changing electromagnetic flux field which at any instant is oppositely directed over the workparts on opposite sides of the seam and decreases in magnitude laterally of the seam from a maximum value at the seam and by using this flux field as a guide line, moving the welding agency laterally of the seam to center it over the seam during its travel lengthwise thereof when departures from this position are indicated by the relative values of voltages induced in a pair of coils which are located on opposite sides respectively of the welding agency at fixed distances respectively from said workparts in positions to link this magnetic flux on opposite sides of the seam.

Further objects of my invention will become apparent from a consideration of the following description of one embodiment thereof which has been diagrammatically illustrated in the accompanying drawing.

In accordance with my invention I established an electromagnetic flux field of changing magnitude lengthwise of a seam by supplying a changing flow of current lengthwise of the edge portions of the workparts at the seam and use this field of flux as a guide for determining the center line of the seam relative to a signal producing means which is sensitive to the relative values of the flux on opposite sides of the seam. Where the workparts are electrically conductive, the exciting current for this flux is supplied through the workparts in opposite directions along the seam on opposite sides thereof and will, due to the impedance of its path, naturally flow with greatest strength at the edges of the workparts at the seam. This effect can be heightened by using high frequency currents for establishing the electromagnetic flux field whereby a further concentration of the current flow and resultant flux at the seam edges will be accomplished due to the so called "skin effect" occasioned by the use of said high frequency currents. This changing current flow through the edges of the workparts generates an elongated electromagnetic flux pattern which extends lengthwise of the seam and from instant to instant changes in magnitude. Substantially equal parts of this electromagnetic flux are directed in opposite directions over the workparts on opposite sides of the seam and each part will at any instant, due to the concentration of current flow at the seam edges, decrease in magnitude laterally of the seam from a maximum value at the seam.

By placing, in accordance with one embodiment of my invention, a pair of coils spaced from one another by a fixed distance on opposite sides respectively of the seam and positioned over the workparts at fixed distances respectively therefrom to link the electromagnetic flux thus established on each side of the seam, it is possible to determine, by comparing the voltages induced in these coils, the relative strengths of the electromagnetic flux fields acting on these coils. When these coils are at predetermined distances from the seam on opposite sides thereof, the relationship of the voltages induced in the coils will attain a predetermined value and departures from this value can be used for centering the coils relative to the seam by moving them laterally of the seam in response to such departure until this predetermined value is reestablished. An automatic centering of the coils over the seam can be obtained by providing automatic means responsive to their induced voltages for moving them laterally of the seam until this predetermined relationship of induced voltages is obtained. The automatic centering means thus provided may be associated with a welding agency or other tool which it is desired to center over the seam as it moved by other means along a path of travel which is generally in a lengthwise direction along the seam.

By using like pick-up coils placed in like positions relative to the seam between the workparts and relative to the welding agency or tool and connecting these coils in opposition to provide a difference signal, the electrical connections thus obtained is such that the polarities, phases, and magnitudes of voltage induced in the coils gives a null in voltage when the welding agency or tool is centered over the seam and departures from this null value of the difference signal voltage can then be used to operate a servomechanism to center the welding agency or tool over the seam.

If the exciting current for generating the electromagnetic flux field is supplied to electrically conductive workparts at fixed points on opposite sides thereof in advance of the welding agency, the closing of the seam by welding shortens the path through which this current flows about the open portion thereof and the current strength from a fixed source of supply will consequently increase and thus cause an increase in the electromagnetic flux at the seam at the unwelded portion thereof as the welding operation progresses. Consequently a given displacement of the welding agency or tool and the pick-up coils associated therewith from the center of the seam at the end portion of the seam being welded will produce a stronger signal upon lateral deviations of like magnitude from the center of the seam than is produced when the welding operation is begun. This may result in a sluggish response or in hunting of the servomechanism which operates to center the welding agency or tool relative to the seam as it passes along the seam. To overcome this difficulty we employ a signal responsive to the sum of the voltages induced in the pick-up coils to control the loop gain of the system and maintain it constant. An automatic gain control responsive to such sum signal may be used to maintain substantially constant the output of a servoamplifier which also responds to the difference voltage signal of the pick-up coils for controlling the servomechanism to center the welding agency or other tool over the seam.

My invention will be more fully understood from a consideration of the embodiment thereof diagrammatically represented in the accompanying drawing. In this drawing the mechanical portion of the system has been skeletonized so as to show the essential parts of an automatic machine by means of which a welding agency is traversed lengthwise of a seam between the workparts which are to be welded together and are suitably supported relative to the machine in assembled relationship, and the electrical portion of the system, by means of which the direction of rotation of a motor is controlled for adjusting the welding agency laterally of the seam as it is traversed lengthwise thereof, has been shown as a block diagram in which the known component parts thereof have been suitably identified. A block diagram has also been employed to show the known component parts of an electric means by which an electromagnetic flux field is established lengthwise of the seam between the workparts to be welded.

As shown in this drawing, the welding agency 1 is traversed lengthwise of a seam 2 between workparts 3 and 4 by an electric motor 5 connected through gearing in casing 6 to a lead screw 7 which extends generally in the direction of the seam. This lead screw 7 imparts motion to a carrier 8 which acts as a support for a slide 9 on which the welding torch 1 is mounted by a bracket 10. The slide 9 is movable crosswise of the seam relative to its carrier 8 by an electric motor 11 which imparts rotation to a cross-adjusting screw 12 with which it is connected through gearing in casing 13. The motor 11 and its gear transmission 13 is supported on one end of the carrier 8 and the cross-adjusting screw 12 makes a threaded engagement with the slide 9. The arrangement is such that reverse rotation of motor 11 will reversely adjust slide 9 relative to its carrier 8 to position the welding agency 1 laterally of the seam as it is traversed lengthwise thereof by the electric motor 5 acting through its gear transmission 6 and lead screw 7 which engages and drives carrier 8. The electric motor 5 is connected, as indicated, to a source of supply by means of which its speed and direction of rotation are controlled to traverse the welding agency 1 along the seam between the workparts. It is of course understood that the parts of the machine just described are suitably supported relative to one another and to the workparts by other members of the machine which for clarity of illustration have not been shown. Also the workparts may be held in assembled relationship in a clamp or clamps forming part of the machine or forming part of a jig which may be positioned in the machine or the machine may be positioned on or over the workparts which are otherwise assembled as by tack welding at spaced positions along the seam between them.

Any suitable welding agency may be employed and we have illustrated an inert arc welding torch which may have the construction illustrated and described in United States Letters Patent 2,512,705, Nelson E. Anderson and George R. Turbett, granted June 27, 1950 and entitled Fluid-Cooled Gas-Blanketed Arc Welding Torch. Welding current is supplied to the electrode 14 of this torch through a welding cable 15 and cooling fluid and inert shielding gas are supplied thereto through hoses 16. Current is also supplied to the workparts 3 and 4 through a welding cable 17 which is connected along with cable 15 to the respective terminals of a suitable source of a welding current supply.

An electromagnetic flux field is established lengthwise of seam 2 between workparts 3 and 4 by supplying a changing flow of current to the workparts in advance of the welding agency through conductors 18 which are connectable to the workparts on opposite sides of the seam. The circuit is completed across the seam by means of the weld which connects the workparts 3 and 4 once the welding operation has been commenced. In some instances it may be desirable to provide for a completion of this circuit by means of tack welds which are made to hold the parts together at the seam prior to the operation of the welding agency in making a continuous weld or a succession of short welds lengthwise of the seam. Any suitable source of current supply which has a changing value may be employed for the purpose of establishing this electromagnetic field. The usual commercially available 60 cycle alternating current may be employed for this purpose and, due to the current through the workparts seeking a path of least resistance, this low frequency exciting current will naturally flow in greatest strength at the seam edges of the workparts to produce an elongated electromagnetic flux pattern substantially equal parts of which are oppositely directed over the workparts on opposite sides of the seam and each part of which at any instant decreases in magnitude laterally of the seam from a maximum value at the seam. In order to secure higher concentrations of current at the seam edges of the workparts I prefer, however, to use high frequency alternating currents in a range up to or greater than 20,000 cycles per second. Such currents may be supplied by an oscillator 19 through an amplifier 20 to the conductors 18 from a suitable source of supply connected to the input terminals of the oscillator 19 as indicated in the drawing. The amplifier will, as indicated, also have a pair of power input terminals in addition to those which are connected to the output terminals of the oscillator.

The welding torch 1 is centered over the seam 2 between the workparts 3 and 4 by a signal producing means which is sensitive to the instantaneous relative values of the electromagnetic flux on opposite sides of the seam. This signal producing means may comprise pick-up coils 21 and 22 which are supported by a pair of arms forming part of the bracket 10 which also supports the welding agency 1. In the arrangement illustrated, these pick-up coils are positioned at equal distances on opposite sides of the welding agency 1 in a plane parallel to the workparts and are electrically of like construction so that equal electromagnetic fluxes linked thereby induce equal voltages in these coils. Each coil has its terminals electrically connected respectively to the input terminals of a sum and difference signal device 23 having two pairs of output terminals respectively connected to a servoamplifier 24 and an automatic gain control 25. This device 23 produces at one pair of its output terminals, which are connected to the servoamplifier 24, a signal which has a value equal to the difference of the voltages induced in pick-up coils 21 and 22 and this signal nulls when the welding agency 1 is centered over the seam between the workparts since under these conditions equal values of voltages will be induced in the pick-up coils. The other pair of output terminals of device 23, which are connected to the automatic gain control, provide simultaneously with this difference signal voltage a signal which is equal to the sum of the voltages induced in pick-up coils 21 and 22. This sum signal voltage acting through the automatic gain control 25 operates to maintain the output of servoamplifier 24 at a substantially uniform value per unit of lateral deviation from the seam by supplying thereto through a connection 26 regulating control grid voltages for the servoamplifier 24.

The servoamplifier 24, in response to the controls exerted simultaneously thereon by the sum and difference voltage values of the pick-up coils 21 and 22, supplies to the input terminals of a phase sensitive detector 27 a control voltage which will vary in phase and amplitude. A reference phase voltage is also supplied to the phase sensitive detector 27 through conductors 28 which are connected across conductors 18 which supply exciting current to the workparts 3 and 4 to establish the electromagnetic field along the seam between these workparts. This connection consequently supplies to the phase sensitive detector a voltage which is in phase with the current supplied to the workparts. The output of the phase sensitive detector 27 is connected through a power amplifier 29 to the electric motor 11 by means of which the welding agency 1 is adjusted laterally of the seam in accordance with the values of voltages induced in pick-up coils 21 and 22 located on opposite sides of the seam. Power current is supplied to the automatic gain control 25, the servoamplifier 24, and the power amplifier 29 by additional connections illustrated.

The control just described comprises an adjusting means operated by electric motor 11 for moving the welding agency 1 and pick-up coils 21 and 22 laterally of the seam 2 to position them along a path of travel which maintains the pick-up coils in a plane parallel to the work and positions them and the welding torch laterally of the seam in response to the signal voltages induced in these pick-up coils. Component 23 of the control system for electric motor 11 provides a signal responsive to the difference value of the voltages induced in pick-up coils 21 and 22 by the electromagnetic flux at the seam for operating an automatic gain controlled servoamplifier 24 to vary its output signal on either side of zero in accordance with the unequal distances of pick-up coils 21 and 22 from the seam. Components 27 and 29 of the control for electric motor 11 constitute a servomechanism responsive to the output signal of the servo-amplifier 24 for operating the adjusting means to center the welding agency over the seam when said output difference signal is zero. Component 25 of the control system for electric motor 11 constitutes a means responsive to the sum value of the voltages induced in pick-up coils 21 and 22 for controlling the loop gain of the servoamplifier 24. This automatic gain control is preferably of the delayed type and does not come into operation until the sum signal of voltages induced in pick-up coils 21 and 22 exceeds a predetermined value.

The constructions of oscillator 19 and amplifiers 20, 24 and 29 will not be described since there may be any of the types well known to those skilled in the art to which this invention relates. Descriptions will, however, be given of suggested constructions for the sum and difference device 23, the automatic gain control 25 and the phase sensitive detector 27.

The sum and difference signal device 23 has internal connections whereby the pick-up coils 21 and 22 are connected in series opposition to its output terminals which are connected to the input terminals of the servoamplifier 24. It also provides connections whereby the output of the pick-up coils 21 and 22 are connected to provide a sum value of these voltages which is supplied through the other pair of its output terminals to the input terminals of the automatic gain control 25. This may be accomplished through the agency of a one to one ratio transformer which has its primary winding connected for energization by one of the pick-up coils and has its secondary winding connected in series additive relation with the output of the other pick-up coil across said other pair of output terminals of this device.

The automatic gain control 25 corresponds to what is commonly known in radio circuits as an automatic volume control. It may be and preferably is as pointed out above of the delayed type, that is it does not function to maintain a substantially constant output until its input attains a predetermined adjustable value. Structurally it may embody a pentode of like characteristics to the pentode or pentodes in the servoamplifier 24 on which it acts to produce a substantially constant output from the servoamplifier to the phase sensitive detector 27 for like deviations of the pick-up coils from the seam at positions lengthwise thereof. The sum input signal to this pentode is applied between its control grid and cathode through a coupling capacitor connected to its control grid and its anode output is connected through a coupling capacitor to one terminal of a parallel tuned circuit of capacity and inductance whose other terminal is connected to the positive terminal of a direct current reference voltage of predetermined value. The first mentioned terminal of the tuned circuit is also connected to the cathode of a diode whose anode is connected through a smoothing circuit and a resistor to the control grid of the pentode. With these connections, the voltage oscillations at the anode of the pentode excites the tune circuit which, when its amplitude of oscillation is greater than that of the reference voltage connecetd thereto supplies, through the diode, the smoothing circuit, and the resistor to the control grid of the pentode, a direct current negative bias voltage which varies in a manner to decrease the output of the pentode and thus regulate its gain. This same regulating negative bias voltage is supplied through a resistor and connection 26 to the control grid or grids of the pentode or pentodes of the servoamplifier which is primarily controlled by the difference signal voltage provided by pick-up coils 21 and 22 acting through the sum and difference signal device 23. This regulates the servoamplifier 24 so that its gain is maintained at a value for best operation of the servomechanism without sluggish response or hunting action.

The phase sensitive detector 27 may embody two transformers respectively energized by the output of the servoamplifier and by the reference phase voltage supplied thereto through conductors 28. The alternating current secondary voltages of these transformers are combined and rectified to charge two capacitors which are connected across the output terminals of the phase sensitive detector to provide direct current voltages which vary in magnitude and polarity depending on the relative magnitude and phase of the alternating current voltages supplied to the primary windings of these transformers. The transformer whose primary winding is connected to the output terminals of the servoamplifier has a midtapped secondary winding whose end terminals are respectively connected to the anodes of two diodes having cathodes which are respectively connected to the output terminals of the phase sensitive detector and consequently across the end terminals of the series connected capacitors above referred to, each of which has a discharge resistance connected across its terminals. The transformer whose primary winding is excited by the reference phase voltage has the terminals of its secondary winding connected respectively to the common terminals of the series connected capacitors and to the midtap of the secondary winding of the other transformer.

It is of course understood that the above description of the components 23, 25 and 27 of the control system for the electric motor 11 need not necessarily have the construction above described since equivalent arrangements may be employed for accomplishing my control purpose.

It is believed that in view of the above descriptions of the structures and operations of the component parts of the embodiment of my invention illustrated in the accompanying drawing, its operation as a whole is apparent. Briefly stated as the welding agency 1 and the pick-up coils 21 and 22 associated therewith are traversed in the general direction of the seam 2 between the workparts 3 and 4 by electric motor 5 acting through connections 6, 7, 8, 9 and 10, and departures of the welding agency from a centered position over the seam will induce unequal voltages in pick-up coils 21 and 22. If the welding agency 1 is centered over the seam the voltage induced in these pick-up coils will be equal. Any departure from this equality of values of induced voltage in pick-up coils 21 and 22 is employed to return them to a position in which the voltages induced in these coils are of equal values which will occur when the welding agency 1 is centered over the seam. This control is obtained through a control circuit embodying components 23, 24, 25, 27 and 29 above described or their equivalents by which the direction of rotation of electric motor 11 is controlled to accomplish this centering operation by moving slide 9 relative to its carrier 8 and thereby moving relatively to the seam the welding agency 1 and pick-up coils 21 and 22 supported by bracket 10 from slide 9.

It is of course apparent that pick-up coils 21 and 22 are representative of only one means which is positioned on opposite sides of the seam between the workparts and responsive to the relative densities of the electromagnetic flux on opposite sides thereof for producing a signal which varies from a predetermined value which occurs when this means is centered over the seam. This predetermined value need not necessarily be zero, as above considered, but may be any arbitrary value, deviations from which may be used for centering the signal producing means over the seam during its travel lengthwise thereof.

It is obvious that the position of pick-up coils 21 and 22 need not be as illustrated in the drawing where they are supported in a common plane with their longitudinal axes at right angles to the workparts. They may have other positions relative to the workparts and to one another but generally their orientation will be selected so that their signals are least sensitive to rotation or tilt. It is also apparent that the coils need not be electrically alike so that like voltages are induced therein by like changes of magnetic flux. If unlike coils are employed, their relative values of induced voltages will be different but the control system may be made responsive to this difference to center them and the welding agency or tool associated therewith relative to the seam being welded or otherwise acted on. Although air core coils have been illustrated in the drawing, because it is preferred to use high frequency guiding fluxes, it is of course apparent that when low frequency currents are employed for generating the guiding flux at the seam, the pick-up coils may have cores made of magnetic material and provided with suitable pole pieces. The distances by which the coils are spaced from the workparts may likewise be different providing their relative spacing from the workparts and from one another are maintained constant in any particular set-up arrangement which it is considered preferable to use.

It is also apparent that the control is not necessarily limited to positioning a welding agency over a seam to be welded but that it may be used for positioning any tool relative to a seam upon which the tool acts as it is traversed lengthwise thereof. The construction of the machine by means of which the welding agency or tool is traversed along a seam and centered relative thereto may be variously modified without departing from the spirit and scope of my invention. In this connection it is to be noted that various types of welding agencies may be employed and that my invention is not limited to the use of arc welding agencies where the flow of welding current in the workparts is employed to produce signals which operate the control by means of which the welding agency is centered over the seam. Consequently any gas welding torch of suitable construction may be used as the welding agency.

Other mechanical arrangements for providing a universal relative movement between the workparts and the welding agency or tool and the flux sensing means associated therewith may be substituted for the particular arrangement diagrammatically illustrated in the drawing. Thus the workparts in assembled relation may be moved bodily relatively to a stationary welding agency and the flux sensing means associated therewith to position the seam between the workparts directly under the welding agency as this seam is traversed lengthwise thereof.

It is also apparent that means other than those described above may be employed for establishing the desired electromagnetic flux field located at the seam and extending lengthwise thereof. In the above description of my invention I have repeatedly referred to the use of a changing flow of current for generating the electromagnetic flux at the seam. I have also referred to the use of alternating current and especially high frequency alternating current. It is to be understood, however, that any other form of changing current flow may be used, for example pulsating, surging or oscillating currents which of course need not be periodic in occurrence. It is also unnecessary to supply the changing flow of current directly to the workparts as illustrated in the drawing for by previously providing conductive connections between the workparts at the seam at positions separated lengthwise thereof it is also possible to produce currents in the edge portions of the workparts at the seam by inductively coupling with the workparts at the seam a winding to which the changing current values are supplied.

The output of the automatic gain control of the system above described may also be connected to control the output of the amplifier connected between the oscillator and the workpieces to assist in maintaining substantially constant the output of the servoamplifier as the seam between the workparts is closed by the welding operation.

These and other variations of my invention will occur to those skilled in the art in view of the above description and illustration of one particular embodiment thereof. It is consequently to be understood that I do not wish to be limited to the single embodiment of my invention above illustrated and described but contemplate by the appended claims to cover all modifications of my invention which fall within the true spirit and scope thereof.

I claim:

1. Apparatus comprising means for establishing lengthwise of a seam between workparts an electromagnetic flux which is oppositely directed over said workparts on opposite sides of said seam and which decreases in magnitude laterally of said seam from a maximum value at said seam, means on opposite sides of said seam and responsive to the relative density of said electromagnetic flux on opposite sides of said seam for producing a signal which varies from a predetermined value which occurs when said means is centered over said seam, means for traversing said workparts and said signal producing means relative to one another lengthwise of said seam, and means operated by said signal producing means and responsive to the deviation of its said signal from its said predetermined value thereof for centering said signal producing means over said seam during its travel lengthwise thereof.

2. Apparatus for following a seam between workparts which comprises a tool, means connectable to said workparts on opposite sides of said seam and lengthwise thereof in advance of said tool for supplying to said workparts a changing flow of current which will produce along said seam an electromagnetic flux which is directed over the workparts on opposite sides of said seam and which decreases in magnitude laterally of said seam from a maximum value at said seam, means for traversing said workparts and said tool relative to one another lengthwise of said seam, means movable with said tool and positioned relative to said workparts to be sensitive to the relative density of said electromagnetic flux on opposite sides of said seam for producing a signal which varies from a predetermined value which occurs when said tool is centered over said seam, and means operated by said last mentioned means and responsive to deviation to its said signal from its said predetermined value thereof for centering said tool over said seam during its travel lengthwise thereof.

3. Apparatus comprising a welding agency, means for traversing said welding agency and a seam between workparts of electrically conductive material relatively to one another lengthwise of said seam, means connectable to said workparts on opposite sides of said seam and lengthwise thereof in advance of said welding agency for supplying to said workparts a changing flow of current which will produce along said seam an electromagnetic flux which is oppositely directed over the workparts on opposite sides of said seam and which decreases in magnitude laterally of said seam from a maximum value at said seam, a pair of coils positioned on opposite sides respectively of said welding agency at fixed distances respectively from said workparts in positions to link said electromagnetic flux on opposite sides of said seam, means for moving said welding agency and said coils laterally of said seam while maintaining said coils in their said relative positions at their said respective fixed distances from said workparts, and means responsive to the relative values of voltages induced in said coils by said electromagnetic flux at said seam for operating said last mentioned means to center said welding agency over said seam.

4. Apparatus comprising a welding agency, means for traversing said welding agency and a seam between workparts of electrically conductive material relatively to one another lengthwise of said seam, means connectable to said workparts on opposite sides of said seam and lengthwise thereof in advance of said welding agency for supplying to said workparts a changing flow of current which will produce along said seam an electromagnetic flux which is oppositely directed over the workparts on opposite sides of said seam and which decreases in magnitude laterally of said seam from a maximum value at said seam, a pair of coils having like voltages induced therein when subjected to like fields of electromagnetic flux, means for supporting said coils at equal distances on opposite sides respectively of said welding agency in a plane parallel to said workparts, adjusting means for laterally moving said welding agency and said coils relatively to said seam along a path of travel which maintains said coils in said plane parallel to said workparts, and means responsive to the difference value of the voltages induced in said coils by said electromagnetic flux at said seam for operating said adjusting means to center said welding agency over said seam when said difference value of induced voltages is zero.

5. Apparatus comprising a welding agency, means for traversing said welding agency and a seam between workparts of electrically conductive material relatively to one another lengthwise of said seam, means for establishing in their edge portions of said workparts at said seam a changing flow of current which is in opposite direction lengthwise said seam on opposite sides thereof and which produces along said seam an electromagnetic flux which is oppositely directed over the workparts on opposite sides of said seam and which decreases in magnitude laterally of said seam from a maximum value at said seam, a pair of coils having like voltages induced therein when subjected to like fields of electromagnetic flux, means for supporting said coils on opposite sides respectively of said welding agency in a plane parallel to said workparts, adjusting means for laterally moving said welding agency and said coils relatively to said seam along a path of travel which maintains said coils in said plane parallel to said workparts, means responsive to the difference value of the voltages induced in said coils by said electromagnetic flux at said seam for operating a servoamplifier to vary its output signal in accordance with the position of said coils relative to said seam, a servomechanism responsive to said output signal of said servoamplifier for operating said adjusting means to center said welding agency over said seam, and means responsive to the sum value of said voltages induced in said coils by said electromagnetic flux at said seams for controlling the loop gain of said servoamplifier to maintain it substantially constant.

6. Apparatus comprising a welding agency, means for traversing said welding agency and a seam between workparts of electrically conductive material relatively to one another lengthwise of said seam, means connectable to said workparts on opposite sides of said seam and lengthwise thereof in advance of said welding agency for supplying to said workparts a changing flow of current which will produce along said seam an electromagnetic flux which is oppositely directed over the workparts on opposite sides of said seam and which decreases in magnitude laterally of said seam from a maximum value at said seam, a pair of coils having like voltages induced therein when subjected to like fields of electromagnetic flux, means for supporting said coils on opposite sides respectively of said welding agency in a plane parallel to said workparts, adjusting means for laterally moving said welding agency and said coils relatively to said seam along a path of travel which maintains said coils in said plane parallel to said workparts, means responsive to the difference value of the voltages induced in said coils by said electromagnetic flux at said seam for operating a servoamplifier to vary its output signal in accordance with the position of said coils relative to said seam, a servomechanism responsive to said output signal of said servoamplifier for operating said adjusting means to center said welding agency over said seams, and means responsive to the sum value of said voltages induced in said coils by said electromagnetic flux at said seam for controlling the loop gain of said servoamplifier to maintain it substantially constant.

7. Apparatus comprising a welding agency, means for traversing said welding agency and a seam between workparts of electrically conductive material relatively to one another lengthwise of said seam, means connectable to said workparts at points which are adjacent to and respectively on opposite sides of said seam and which are spaced lengthwise of said seam ahead of said welding agency for supplying to said workparts a flow of 60 to 20,000 cycle alternating current which will produce along said seam an electromagnetic flux which is oppositely directed over the workparts on opposite sides of said seam and which decreases in magnitude laterally of said seam from a maximum value at said seam, a pair of coils having like voltages induced therein when subjected to like fields of electromagnet flux, means for positioning said coils at equal distances on opposite sides respectively of said welding agency in a plane parallel to said workparts, adjusting means for laterally moving said welding agency and said coils relatively to said seam along a path of travel which maintains said coils in said plane parallel to said workparts, means responsive to the difference value of the voltages induced in said coils by said electromagnetic flux at said seam for operating a servoamplifier to vary its output signal on either side of zero in accordance with the unequal distances of said coils from said seam, a servomechanism responsive to said output signal of said servoamplifier for operating said adjusting means to center said welding agency over said seam when said output signal is zero, and means responsive to the sum value of said voltages induced in said coils by said electromagnetic flux at said seam for controlling the loop gain of said servoamplifier to maintain it substantially constant.

8. Apparatus for following a seam between workparts in which a changing flow of current along the seam edges has produced an electromagnetic flux which is oppositely directed over the workparts on opposite sides of said seam and which decreases in magnitude laterally of said seam from a maximum value at said seam, said apparatus comprising a pair of like coils, means for supporting said coils on opposite sides respectively of said seam in like positions relative thereto and to said workparts, and means responsive to the difference value of the voltages induced in said coils by said electromagnetic flux at said seam for centering said supporting means for said coils over said seam when said difference value is zero.

9. Apparatus for following a seam between workparts in which a changing flow of current along the seam edges has produced an electromagnetic flux which is oppositely directed over the workparts on opposite sides of said seam and which decreases in magnitude laterally of said seam from a maximum value at said seam, said apparatus comprising a pair of coils, means for supporting said coils on opposite sides respectively of said seam for movement laterally thereof in a plane parallel to said workparts, and means responsive to the difference value of the voltages induced in said coils by said electromagnetic flux at said seam for operating said last mentioned means to locate said supporting means for said coils in a predetermined position relative to said seam when said difference voltage attains a predetermined value.

10. Apparatus for following a seam between workparts in which a changing flow of current along the seam edges has produced an electromagnetic flux which is oppositely directed over the workparts on opposite sides of said seam and which decreases in magnitude laterally of said seam from a maximum value at said seam, said apparatus comprising a pair of coils, means for supporting said coils on opposite sides respectively of said seam in a plane parallel to said workparts, adjusting means for laterally moving said supporting means for said coils relatively to said seam along a path of travel which maintains said coils in said plane parallel to said workparts, means responsive to the difference value of the voltages induced in said coils by said electromagnetic flux at said seam for operating a servoamplifier to vary its output signal in accordance with the position of said coils relative to said seam, a servomechanism responsive to said output signal of said servoamplifier for operating said adjusting means to center said supporting means for said coils over said seam, and means responsive to the sum value of said voltages induced in said coils by said electromagnetic flux at said seam for controlling the loop gain of said servoamplifier to maintain it substantially constant.

11. The method of locating a seam between electrically conductive workparts which comprises establishing an electromagnetic flux at said seam by supplying through the edge portions of said workparts at said seam on opposite sides thereof a changing flow of current which is in opposite directions lengthwise of said seam on opposite sides thereof, inducing voltages in a pair of coils spaced from one another by a fixed distance by placing them respectively on opposite sides of said seam and over said workparts at fixed distances respectively therefrom in positions to link said electromagnetic flux on opposite sides of said seam, and moving said coils laterally of said seam while maintaining them in their said relative positions at their said respective fixed distances from said workparts until the voltages induced in said coils attain a predetermined relationship which corresponds to that obtained with a known spacing of each of said coils from its side of said seam.

12. The method of locating a seam between electrically conductive workparts which comprises establishing an electromagnetic flux at said seam by supplying through the edge portions of said workparts at said seam on opposite sides thereof a changing flow of current which is in opposite directions lengthwise of said seam on opposite sides thereof, inducing voltages in a pair of coils spaced from one another by a fixed distance by placing them respectively on opposite sides of said seam and over said workparts at fixed distances respectively therefrom in positions to link said electromagnetic flux on opposite sides of said seam, obtaining the algebraic sum of the voltages induced in said coils by connecting them in circuit with one another, and moving said coils laterally of said seam while maintaining them in their said positions and at their said respective fixed distances from said workparts until said algebraic sum of the voltages induced in said coils attain a predetermined value which occurs when said coils are on opposite sides of said seam and respectively spaced laterally therefrom by predetermined distances.

13. The method of locating a seam between electrically conducted workparts which comprises establishing an electromagnetic flux at said seam by supplying through the edge portions of said workparts at said seam on opposite sides thereof a flow of 60 to 20,000 cycle alternating current which is in opposite direction lengthwise of said seam on opposite sides thereof, inducing voltages in a pair of like coils spaced from one another by a fixed distance and positioned in a plane parallel to said workparts to link said electromagnetic flux on opposite sides of said seam, and moving said coils laterally of said seam in said plane parallel to said workparts until the voltage induced in one of said coils is equal to the voltage induced in the other of said coils which occurs when said coils are on opposite sides of said seam and respectively spaced laterally therefrom by substantially equal distances.

14. The method of centering a welding agency over a seam between workparts during its travel lengthwise thereof which comprises establishing an electromagnetic flux at said seam by supplying through the edge portions of said workparts at said seam on opposite sides thereof a changing flow of current which is in opposite directions lengthwise of said seam on opposite sides thereof, determining the relative densities of said flux on opposite sides of said seam by inducing voltages in a pair of coils which are respectively placed on opposite sides of said welding agency at fixed distances therefrom, traversing said welding agency and said coils in the general direction of said seam with said coils on opposite sides thereof and over said workparts at fixed distances respectively therefrom in positions to link said electromagnetic flux on opposite sides of said seam, and, during its travel lengthwise of said seam, moving said welding agency and said coils laterally of said seam with said coils in their said positions relative to said welding agency and at their said respective fixed distances from said workparts to maintain the voltages induced in said coils at a predetermined relationship which corresponds to that obtained when said welding agency is centered over said seam.

References Cited in the file of this patent
UNITED STATES PATENTS
2,679,620    Berry _____ May 25, 1954